United States Patent
Kanoh (10) Patent No.: US 9,873,962 B2
(45) Date of Patent: Jan. 23, 2018

(54) METHOD OF FORMING A SYNTHETIC RESIN STRUCTURE INTEGRAL WITH TWO-DIMENSIONAL STEEL FABRIC

(71) Applicant: SNP Company Ltd., Aichi (JP)

(72) Inventor: Noriyuki Kanoh, Aichi (JP)

(73) Assignee: SNP Company Ltd., Aichi (JP)

( * ) Notice: Subject to any disclaimer, the term of this patent is extended or adjusted under 35 U.S.C. 154(b) by 0 days.

(21) Appl. No.: 15/591,288

(22) Filed: May 10, 2017

(65) Prior Publication Data

US 2017/0327980 A1 Nov. 16, 2017

(30) Foreign Application Priority Data

May 16, 2016 (JP) .................................. 2016-97699

(51) Int. Cl.
*B29C 45/14* (2006.01)
*D03D 15/02* (2006.01)
(Continued)

(52) U.S. Cl.
CPC ............... *D03D 15/02* (2013.01); *D02G 3/12* (2013.01); *D03D 1/00* (2013.01)

(58) Field of Classification Search
CPC . D03D 15/02; D03D 1/00; D02G 3/12; B29C 2043/3216; B29C 44/14; B29C 44/143; B29C 44/145; B29C 44/146; B29C 44/32; B29C 44/321; B29C 45/14; B29C 45/14008; B29C 45/14065; B29C 45/14508; B29C 45/14532;
(Continued)

(56) References Cited

U.S. PATENT DOCUMENTS

| 9,102,288 B2* | 8/2015 | Lokere | B60R 19/03 |
| 9,278,480 B2* | 3/2016 | Masini | B29C 33/301 |
| 2017/0203551 A1* | 7/2017 | Davis | B32B 27/12 |

FOREIGN PATENT DOCUMENTS

| JP | S52-100068 U | 1/1977 |
| JP | S60-177699 A | 9/1985 |

(Continued)

OTHER PUBLICATIONS

Notice of Allowance issued in corresponding Japanese Patent Application No. 2016-97699 dated Dec. 6, 2016.
(Continued)

*Primary Examiner* — Jun Yoo
(74) *Attorney, Agent, or Firm* — Morgan, Lewis & Bockius LLP (57) ABSTRACT

In a method of forming a synthetic resin structure integral with two-dimensional steel fabric, a warp and woof are made from a steel metal, and these wires are woven in a planar configuration to provide a two-dimensional steel fabric which is then pressed into a flat structure. Two flat structures are set at a metallic mold die, into which a synthetic resin is injected so as to form a synthetic resin body integral with the flat structures. This makes it possible to secure a sufficient space between the flat structures, and spread the synthetic resin fully into the flat structures so as to reinforce a surface of the synthetic resin body with durability and high rigidity. Through the toughness, strength and price of the steel metal, it is possible to provide a marketability with products manufactured by using the present method.

7 Claims, 10 Drawing Sheets

(51) Int. Cl.
*D02G 3/12* (2006.01)
*D03D 1/00* (2006.01)

(58) Field of Classification Search
CPC ...... B29C 45/1454; B29C 2045/14098; B29C 33/16; B29C 2043/3211
See application file for complete search history.

(56) References Cited

FOREIGN PATENT DOCUMENTS

| | | |
|---|---|---|
| JP | H02-096794 U | 8/1990 |
| JP | H05-038774 A | 2/1993 |
| JP | H05-208471 A | 8/1993 |
| JP | H07-506542 A | 7/1995 |
| JP | H10-140440 A | 5/1998 |
| JP | 2002-300905 A | 10/2002 |
| JP | 2004-276478 A | 10/2004 |
| JP | 2008-126632 A | 6/2008 |
| JP | 2014-065997 A | 4/2014 |
| JP | 2014-181434 A | 9/2014 |

OTHER PUBLICATIONS

Office Action issued in corresponding Japanese Patent Application No. 2016-97699 dated Aug. 23, 2016.
Arguments and amendments submitted on Oct. 17, 2016 in response to the Office Action issued in Japanese Patent Application No. 2016-097699 (translation only).
Extended European Search Report issued in related European Patent Application No. 17170474.5 dated Aug. 24, 2017.

* cited by examiner

Weaving Step A

Plain-woven Metallic Net

Fig. 3
Severing Step B

Fig. 10 wire line (1, 2) warps, woofs
cruciate in cross section

Fig. 11 wire line (warps 1, woofs 2)
wires twisted into stranded wire

Fig. 12 wire line (warps 1, woofs 2)
helix configuration

Fig. 13 Setting Step

Fig. 14 Closing Metallic Mold Die

Fig. 15 Opening Metallic Mold Die

Fig. 28
twill-weave wire mesh

Fig. 29
Dutch plain-weave wire mesh

Fig. 30
wire-stranded mesh warps : twisted wires
woofs : untwisted single wires

METHOD OF FORMING A SYNTHETIC RESIN STRUCTURE INTEGRAL WITH TWO-DIMENSIONAL STEEL FABRIC

BACKGROUND OF THE INVENTION

Field of the Invention

The present invention relates to a method of forming a synthetic resin structure integral with two-dimensional steel fabric. The synthetic resin structure has an obverse side and reverse side, at each of which the steel fabric is placed to facilitate the formation of panel-like resin structure integral with the steel fabric.

Description of Related Art

In a method of forming a plastic compound resin into a panel-like resin structure, disclosed is a technique in which a resin and a metallic net are integrally solidified (referred hereinafter to Japanese laid-open patent application No. 06-293098 as a second prior art).

A compound resin forming technique is disclosed in which an outer surface is solidified integral with the resin (referred hereinafter to Japanese patent No. 3587169 as a third prior art). A method is disclosed to make a resin integrally with a metallic layer and reinforced fibrous layer and meshed sheet (referred hereinafter to Japanese laid-open patent application No. 2013-146988 as a fourth prior art). Also, a method is disclosed to provide a resin reinforced with carbon fiber fabric or a way how to insert a three-dimensional steel fabric (referred hereinafter to Japanese laid-open patent application Nos. 2005-329567 and 2003-011233 as fifth and sixth prior art in turn).

Among the methods raised above, in the technique how to mold the metallic net with the resin (second prior art), the metallic net is heat treated and penetrate into a foamed resin. The method is usable for making a ferro-concrete frame. However, it is difficult to use the method especially when forming a complicatedly thinned structure such as an outer board panel used for automobile.

In the third prior art, the way is shown how to make the reinforcement integral with the panel-like product (instrument panel). That is a composite material in which the resin is solidified integral with the outer surface material and the reinforcement. The composite material is quite other than a structure devoid of the outer surface material.

The fourth prior art is prepared to cope with VaRTM (Vacuum-Assist-Resin-Transfer-Molding) in which a metallic leaf is molded integral with a reinforced resin in order to secure a flame-retardant property. The method intends to reinforce the metallic leaf provided at both front and rear sides to be solidified with the resin. The method does not aim to form a thinned and complicated composite panel structure which is observed at the outer board panel used for automobile. The method has complicated steps to prepare several layers of reinforcements impregnated with the resin and harden the resin with the reinforcements. The method has a disadvantage in not increasing the physical strength of the panel even in view of the complicated structure.

In a method of using the CFRP (Carbon Fiber Reinforced Plastics), a plain-woven or twill-woven carbon mat is made by solidified with a resin. Thereafter, the several sheets (e.g. eight sheets) of the carbon mats are laminated each other by means of adhesive. After appropriately forming the laminated-layers, the lamination is placed into a mold die to be integral with the resin as observed in Japanese laid-open patent application No. 07-76890 and the second prior art.

The method compensates for the tendency that the carbon fibers are extremely thin and having a disadvantage in being short of rigidity. The method accompanies a multiple steps of severing, forming and laminating the carbon mats during the molding procedures in addition to the carbon mats being expensive. This brings a number of difficulties in implementing the molding procedures including the fact that the carbon mats placed in the mold die must serve as inserts and be fully impregnated with resin.

Even if the way to weave three-dimensional fabrics are completed as observed in Japanese laid-open patent application Nos. 09-506676, 11-514928 and U.S. Pat. No. 5,137,058, it would take a long time before the three-dimensional fabrics are really put into practical use in the industrial field.

In the way how to mold the reinforcement into the resin, powdered filler or metallic insert has been used. The metallic insert refers to using a steel plate as a hardness-improved material in order to increase the mechanical strength. The steel plate, however, has an inescapable disadvantage to increases its weight.

In other method similar to the above, no way has been developed yet to form the complicatedly thinned structure such as the outer board panel used for various types of vehicles.

In general, the bending strength of the panel depends mainly on the tensile strength of the outer surface. Taken the board panel for example, if the reinforcement is fully spread into the upper and lower surfaces, it is possible to remarkably increase the bending strength of the board panel. It is all the more true when the reinforcement is fully solidified to be integral with the matrix (resin).

Therefore, the present invention has been made with the above drawbacks in mind, it is a main object of the invention to provide a method of forming a synthetic resin structure integral with two-dimensional steel fabric which is capable to secure an enough space between reinforcements and attain a high strength with a minimum amount of the reinforcements by only using a two-dimensional steel fabric.

In the present invention, a hardness-improved steel plate is not used as an insert or reinforcement, instead, steel wires are woven to form a fabric or texture as a steel mat. The steel mats are placed on corresponding upper and lower surface positions, and then the synthetic resin is poured into the mold die, so that the reinforcements are solidified to be integral with the resin. The molded product has surfaces made with a composite structure consisting of the resin and the reinforcement, while an inner space between the reinforcements is filled only with the resin. This makes it possible to impart the high strength to the composite structure, the strength of which is substantially equivalent to the strength of a steel box pipe.

In the present invention, the two-dimensional fabric is placed on both the obverse and reverse sides to form a cubic reinforcement structure. The cubic reinforcement structure has an advantage in facilitating the resin to penetrate into the inner space between the reinforcements, while covering both the surfaces with the composite structure consisting of the reinforcement and the resin.

As for the buckling phenomenon related to the bending strength of the composite structure, since the reinforcements are the two-dimensional steel fabric, and both the surfaces are made integral with the composite structure, the composite structure exhibits a strong resistance to the buckling phenomenon by appropriately selecting the inner matrix.

Generally speaking, when plates of quite different strength are laminated as represented by the combination of the steel plate and plastic plate, an irregular strength region is occurred in which the strength differs at the boundary between the plates. The irregular strength region is susceptible to an exterior force (impact) and weakens the lamination even if the plates are sufficiently laminated by means of adhesive.

As opposed to the above lamination, the present invention is capable to alleviate an occurrence of the irregular strength region so as to endure the exterior force because of the composite structure in which the two-dimensional steel fabrics are solidified at the upper and lower surfaces as the reinforcements to be integral with the resin.

SUMMARY OF THE INVENTION

According to the present invention, there is provided a method of forming a synthetic resin structure integral with two-dimensional steel fabric, warps and woofs are made from a steel metal including a piano wire, so that warps and woofs are woven to form a two-dimensional steel fabric in a planar configuration. The two-dimensional steel fabric is severed by a predetermined quantity to make a fabric piece and forming the fabric piece into a flat structure by means of a shape-forming instrument including a pressing procedure. A plurality of the flat structures are prepared and setting one of the flat structures at an upper die, and setting other of the flat structures at lower die of a metallic mold die. The flat structures are juxtaposed mutually in parallel relationship with a minimum distance apart between neighboring ones of the flat structures.

Then, a synthetic resin is injected into the metallic mold die so as to form a synthetic resin body integral with the flat structures, so that the flat structures are embedded into the synthetic resin body as reinforcements.

With the structure described above, the flat structures are made from high-strength steel wires including piano wires. This makes it possible to make the flat structures both tough and endurable enough to resist against high pressures and temperatures. This means that the present method covers all types of resin-forming methods available including the conventional injection mold and resin-mold method. During the resin-injecting process, the resin readily penetrates into a small space formed by the minimum distance between the flat structures.

This makes it possible to attach the resin tightly to the flat structures with high density, thereby forming a three-dimensional structure body, the strength of which is continuously built-up to resultantly provide a tough and endurable resin structure body.

According to other aspect of the present invention, since the warps and woofs forms a plurality of wires twisted to serve as a stranded wire, it is possible to make the flat structures more elastic and pliable.

According to other aspect of the present invention, the synthetic resin includes both a thermoplastic material and thermosetting plastics and forms a moldable resin selected from a group consisting of ABS resin, polypropylene, polystyrene and polyurethane. When the moldable resin is represented by an inexpensive polypropylene or ABS resin, it is possible to form the flat structures with a cost-saving procedure.

According to other aspect of the present invention, the metallic mold die has a first magnet piece embedded in the upper die and having a second magnet embedded in the lower die. Upon setting the flat structures at the metallic mold die, one of the flat structures is attached to the upper die by a magnetic attraction of the first magnet piece. Other flat structures are attached to the lower die by a magnetic attraction of the second magnet piece.

With the first and second magnet pieces provided on the metallic mold die, it is possible to place the flat structures in position without using an adhesive during the resin-forming procedure through an interaction with the magnetism induced from the flat structures.

According to other aspect of the present invention, the metallic mold die has a first electric magnet embedded in the upper die and having a second electric magnet embedded in the lower die. The first and second electric magnet are energized when setting the flat structures at the metallic mold die. One of the flat structures is attached to the upper die by a magnetic attraction of the first electric magnet. Other flat structures are attached to the lower die by a magnetic attraction of the second electric magnet. The first and second electric magnets are deenergized when opening the metallic mold die so as to release the flat structures from the metallic mold die.

With the first and second electric magnet each attached to the upper and lower die during the resin-forming procedure, it is possible to place the flat structures in position toward the upper and lower die through the magnetic attraction, and release the flat structures from the metallic mold die upon opening the metallic mold die.

According to other aspect of the present invention, the synthetic resin body is dimensionally 50 mm at maximum in thickness with the minimum distance measured as 0.5 mm-10 mm. These dimensional arrangements make it possible to apply the synthetic resin body to multiple types of products in various industrial fields.

According to other aspect of the present invention, the two-dimensional steel fabric has an outer surface including an obverse surface side and a reverse surface side. The two-dimensional steel fabric is partly depressed to shape a concave recess from the obverse surface side toward the reverse surface side to let the concave recess serve as a strengthened jut at the time of forming the two-dimensional steel fabric from the warps and woofs.

With the concave recess serving as the strengthened jut, it is possible to significantly reinforce the synthetic resin body with the minimum cost.

BRIEF DESCRIPTION OF THE DRAWINGS

A preferred form of the present invention is illustrated in the accompanying drawings in which.

DETAILED DESCRIPTION OF PREFERRED EMBODIMENTS

In the following description of the depicted embodiments, the same reference numerals are used for features of the same type.

Figure 1:
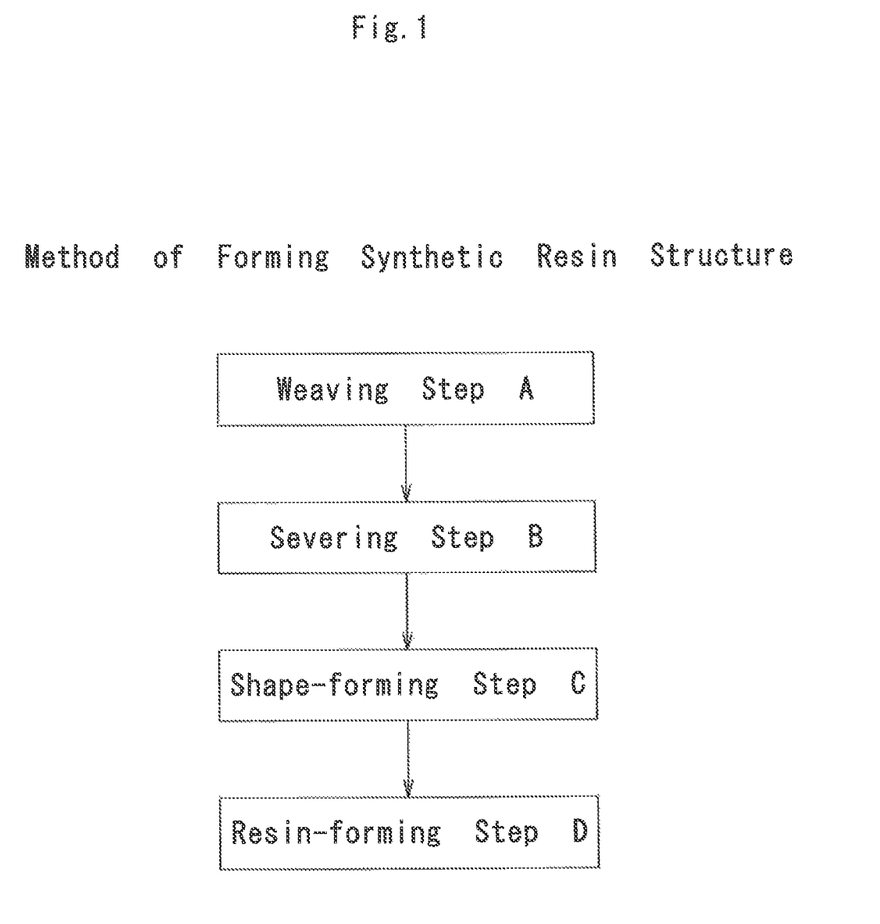
FIG. 1 is a block diagram depicted a sequence how to form a two-dimensional steel fabric according to a first embodiment of the invention.

Referring to FIGS. 1 through 8, shown is a method of forming a synthetic resin structure integral with two-dimensional steel fabric according to a first embodiment of the invention. As shown in FIG. 1, the method has a weaving step (A), a severing step (B), a shape-forming step (C) and a resin-forming step (D).

Figure 2:
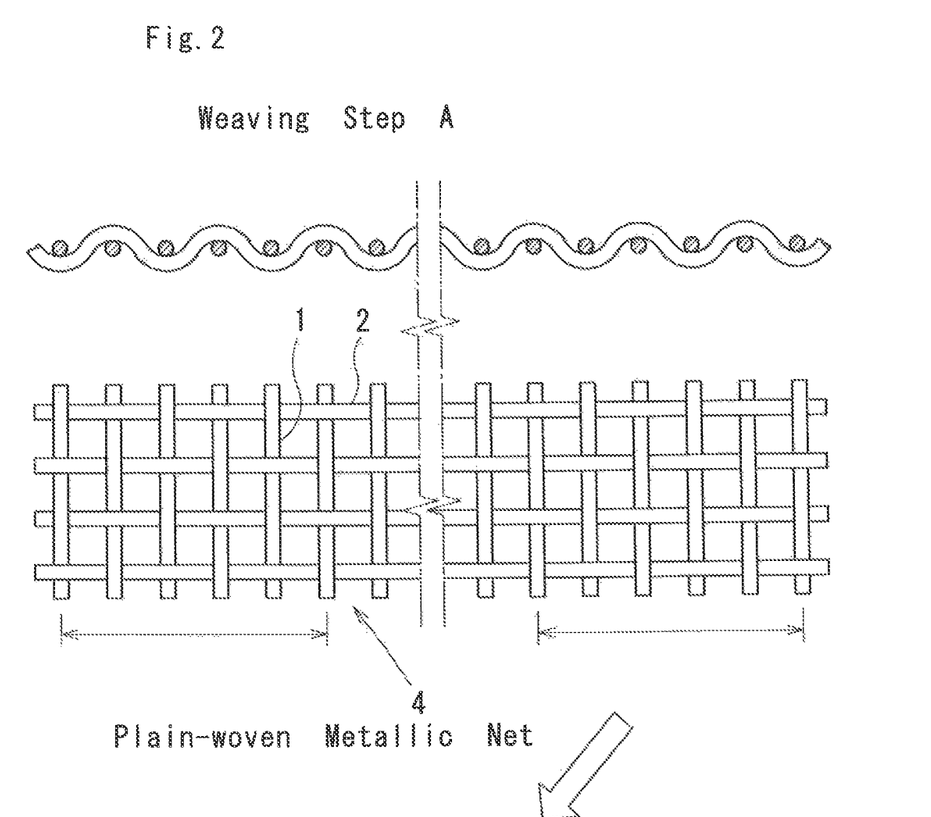
FIG. 2 is a longitudinal cross sectional view and plan view of the two-dimensional steel fabric.

In the weaving step (A), warps 1 and woofs 2 are prepared, each of which is made from a steel metal including a piano wire, and the warps 1 and woofs 2 are woven or knitted as a steel mat to provide a two-dimensional steel fabric 4 in a planar configuration as shown in FIG. 2.

The warps 1 and woofs 2 constitutes the two-dimensional steel fabric 4. These warps 1 and woofs 2 are made from the piano wires as high-strength steel wires to provide a flat structure 6 as described hereinafter in detail.

Figure 3:
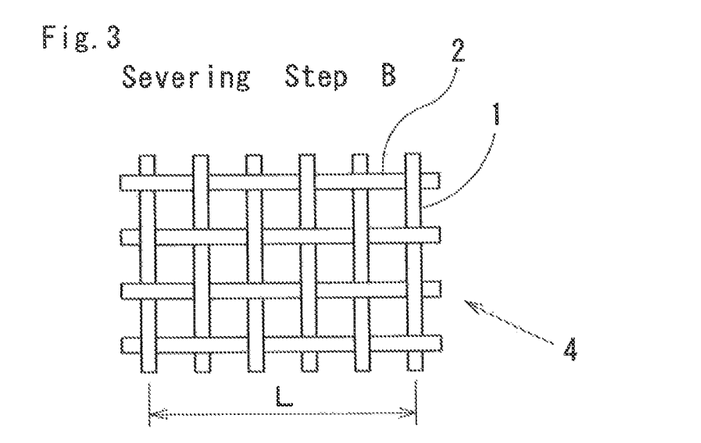
FIG. 3 is a plan view of a fabric piece produced by severing a predetermined quantity of the two-dimensional steel fabric.

The warps 1 and woofs 2 are each prepared from the piano wires as the high-strength steel wires, and the warps 1 and woofs 2 are woven or knitted together as a plain weave. In the severing step (B), the two-dimensional steel fabric 4 is severed appropriately by a predetermined quantity to have a predetermined length (L) to resultantly shape a fabric piece as shown in FIG. 3.

Figure 4:
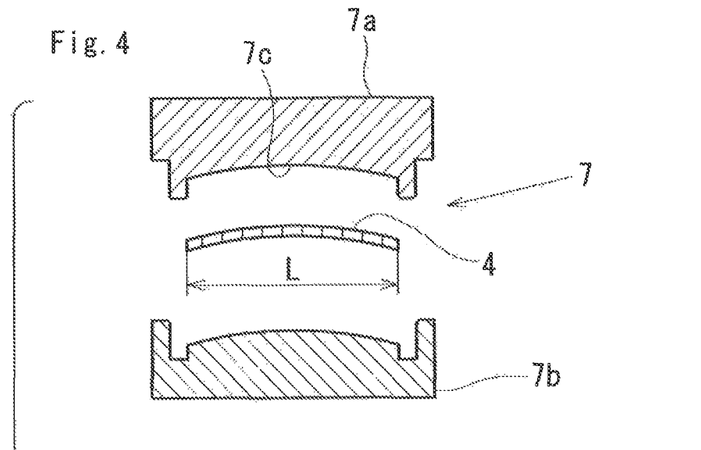
FIGS. 4 through 6 are longitudinal cross sectional views of a metallic press die sequentially depicted to show processes how to form a flat structure.
Figure 5:
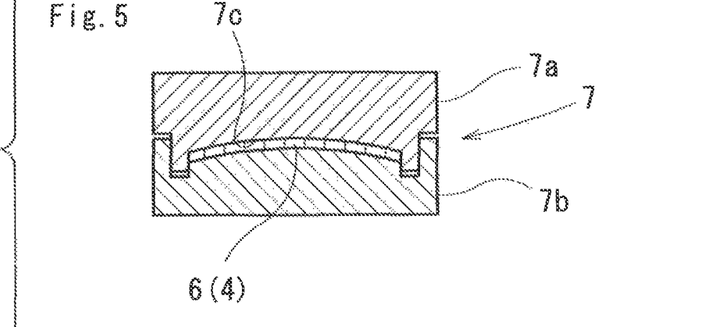

In the shape-forming step (C), the severed steel fabric 4 (the fabric piece) is placed on a metallic press die 7 which serves as a shape-forming instrument as shown in FIG. 4. The metallic press die 7 has an upper press die 7a and lower press die 7b, the upper press die 7a is driven to move toward the lower press die 7b, thereby imparting the severed steel fabric 4 with a predetermined shape so as to provide the flat structure 6 as shown in FIG. 5.

Figure 6:
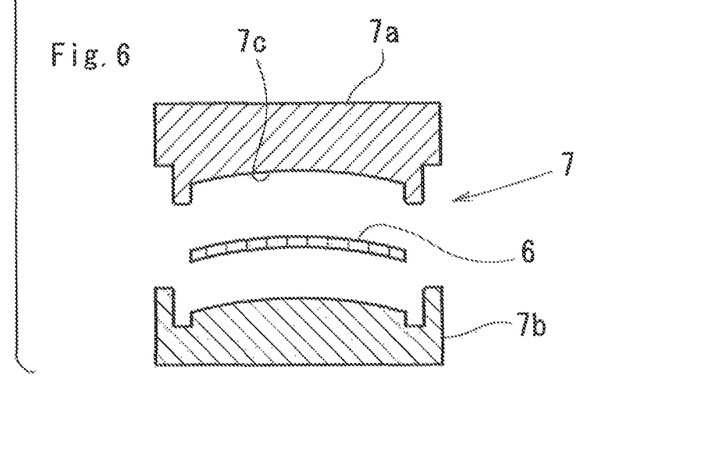

After pressing the severed steel fabric 4 by the metallic press die 7, the upper press die 7a is lifted to move away from the lower press die 7b, so that the metallic press die 7 is opened to take out the pressed steel fabric 4 from the metallic press die 7 as shown in FIG. 6.

By way of example, two flat structures 6 are prepared in the first embodiment of the invention.

It is to be noted that instead of the metallic press die 7, a hydraulic pressure instrument (machine) or a bending machine may be used.

In this instance, the metallic press die 7 has a press cavity 7 surrounded by the upper press die 7a and lower press die 7b. The press cavity 7 corresponds to a mold cavity 8c which constitutes a metallic mold die 8 in a resin-forming step (D).

Figure 7:
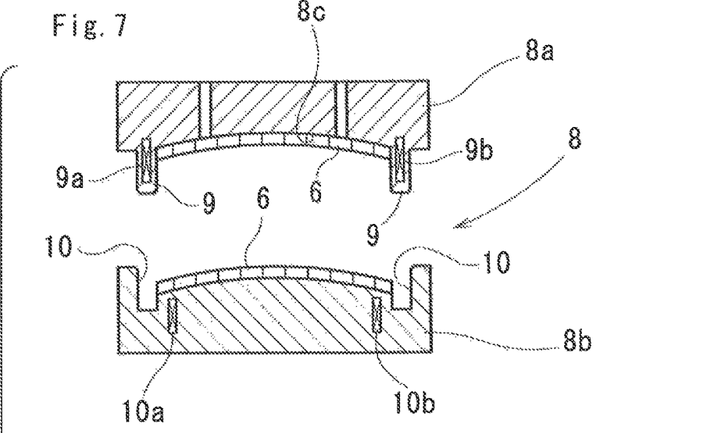
FIGS. 7 through 9 are longitudinal cross sectional views of a metallic mold die sequentially depicted to show processes how to form a synthetic resin body.

In the resin-forming step (D), two flat structures 6 are prepared by way of illustration. These flat structures 6 are set each as insert means within the mold cavity 8c of the metallic mold die 8 as shown in FIG. 7. The metallic mold die 8 has an upper mold die 8a and lower mold die 8b. One of the two flat structures 6 is attached to an upper mold die 8a and the other of the two flat structures 6 is attached to a lower mold die 8b.

The upper mold die 8a has a loop-shaped projection 9 surrounding the one flat structure 6 and the lower mold die 8b has loop-shaped groove 10 which corresponds to the projection 9 and surrounds the other flat structure 6. Into the projection 9, a first magnet piece 9a (9b) is embedded at each of a right and left side, and a second magnet piece 10a (10b) is embedded into the lower mold die 8b at each of a right and left side in the proximity of the groove 10.

The flat structures 6 are set within the mold cavity 8 and juxtaposed mutually in parallel relationship with a minimum distance (H) apart as a small space between the neighboring flat structures 6. When the number of the flat structures 6 exceeds 2, the flat structures 6 can be set juxtaposed mutually in parallel relationship with a minimum distance (H) apart between neighboring ones of the flat structures 6.

Figure 8:
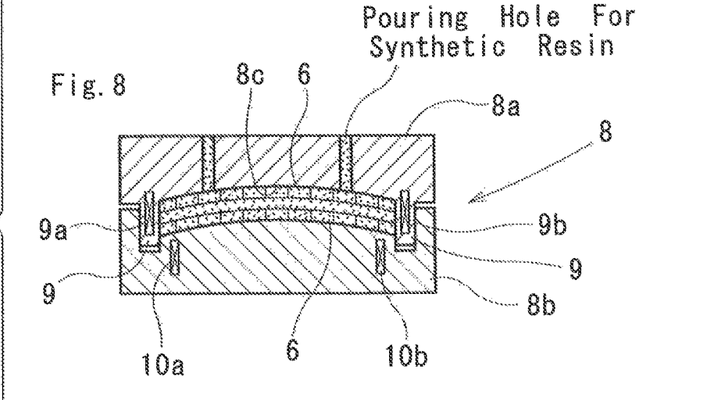

Thereafter, the metallic mold die 8 is driven to move the upper and lower mold dies 8a, 8b to hermetically close both the mold dies 8a, 8b as shown in FIG. 8.

After closing the mold dies 8a, 8b with a use of the injection mold or resin-pouring procedure, a synthetic resin is supplied to fill the mold cavity 8c with the synthetic resin.

Within the mold cavity 8c, provided as a reinforcement means is a synthetic resin body 11 served as a synthetic resin product 12 which is shaped integral with the flat structures 6, while maintaining the minimum distance (H) between the upper flat structure 6 and the lower flat structure 6.

The synthetic resin employed herein includes both a thermoplastic material and thermosetting plastics and forms a moldable resin (including engineering plastics) selected from a group consisting of ABS resin (acronym of copolymerized acrylonitrile, butadiene and styrene), polypropylene, polystyrene and polyurethane. When the moldable resin is represented by an inexpensive polypropylene or ABS resin, it is possible to form the flat structures 6 with a cost-saving procedure.

Figure 9:
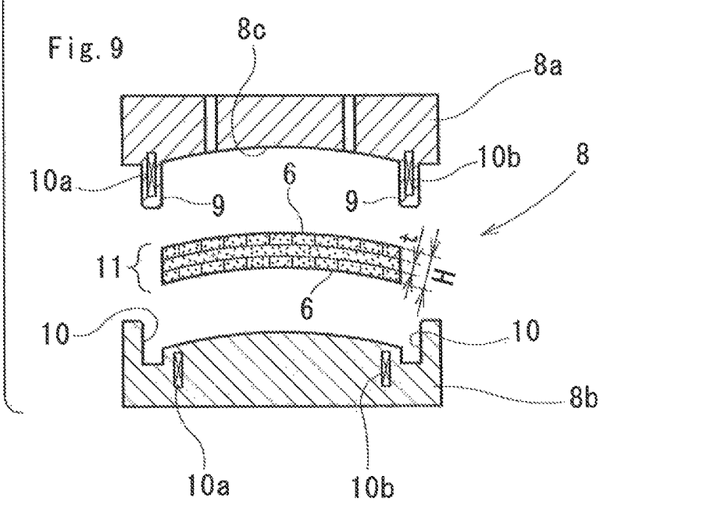

After closing the metallic mold die 8 for a certain period of time, the metallic mold die 8 is opened as shown in FIG. 9. Taken out from the opened mold die 8 is the synthetic resin body 11 which is shaped integral with the flat structures 6.

Within the synthetic resin body 11, the flat structures 6 located as the reinforcements at an upper and lower position. The synthetic resin body 11 is dimensionally up to 50 mm at maximum in thickness (t) with the minimum distance (H) measured as 0.5 mm-10 mm (see FIG. 9).

With the structure thus far described, the warps 1 and woofs 2 are woven or knitted together to form the two-dimensional steel fabric 4. The two-dimensional steel fabric 4 is severed by the predetermined quantity and shaped into the two flat structures 6. The flat structures 6 are arranged within the synthetic resin body 11 in parallel relationship, and shaped appropriately within the cavity by way of the injection mold or resin-pouring procedure.

With the flat structures 6 made by high-strength steel wires including piano wires, it is possible to apply not only the resin-pouring procedure but also the injection mold procedure, the latter of which requires to resist high pressures. The synthetic resin body 11 has an outer surface reinforced by the flat structures 6 and insures an enough space between the flat structures 6. This makes it possible to achieve a high strength structure with a minimum amount of the reinforcement.

With the first and second magnet pieces (9a, 9b, 10a, 10b) each provided on the metallic mold die 8, it is possible to place the flat structures 6 firmly in position without using an adhesive agent during the resin-forming procedure. This is due to a magnetic interaction with the flat structures 6 made of the steel metal.

With the flat structures 6 appeared as the small space (H) therebetween, it becomes possible for the flat structures 6 to move individually within the synthetic resin poured into the within the metallic mold die 8. This makes it possible to prevent the flat structures 6 float from partly exposed outside the synthetic resin body 11 when hardened by means of setting shrinkage or polymerization shrinkage.

Figure 10:
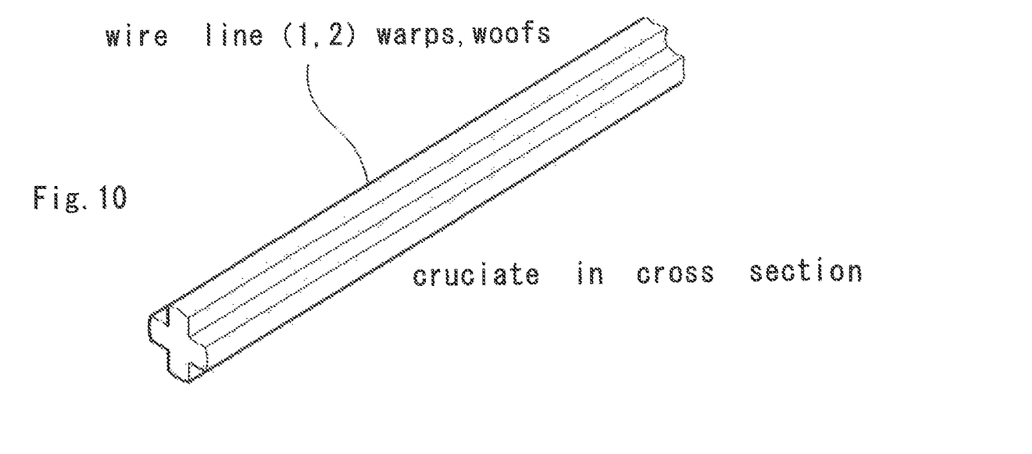
FIGS. 10 through 12 are perspective views of modified wire elements constituting warps and woofs.
Figure 11:
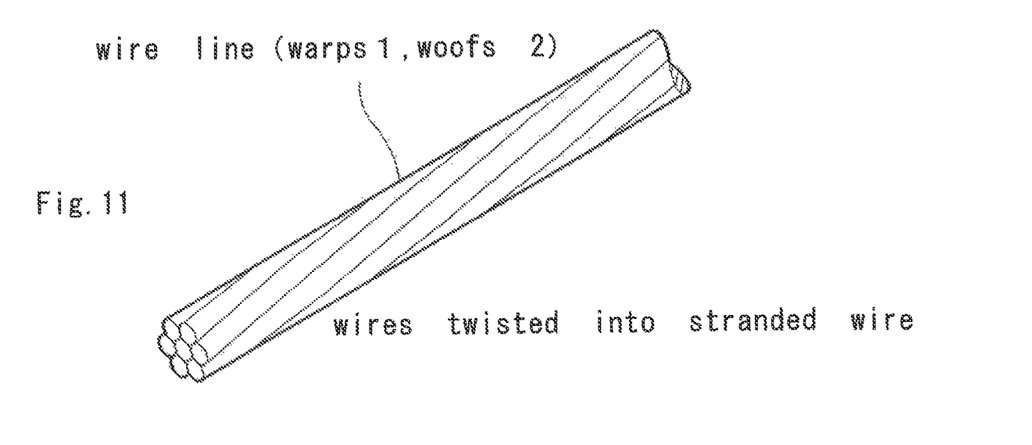
Figure 12:
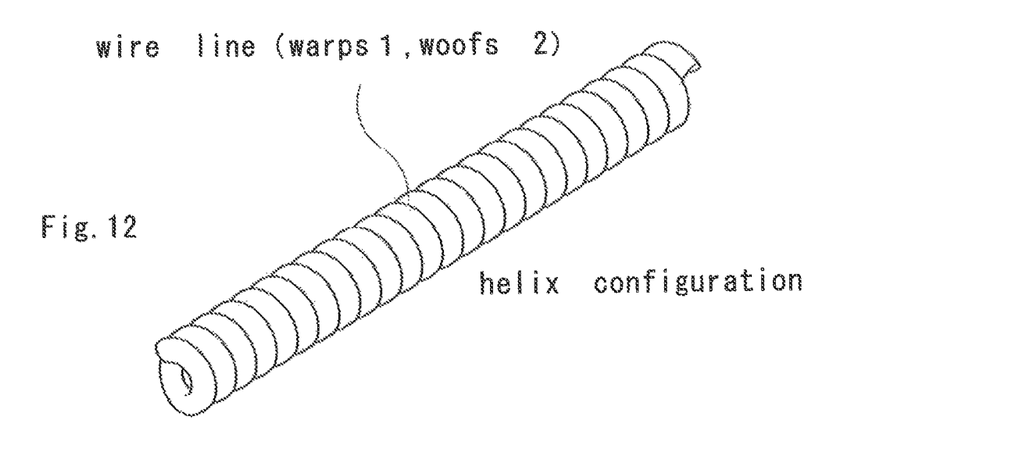

FIGS. 10 through 12 show modification forms which the warps 1 and woofs 2 exhibit to increase an contact area between the flat structures 6 and the synthetic resin body 11 so as to solidly unite the flat structure 6 integral with the synthetic resin body 11.

As illustrated in FIG. 10, the warps 1 and woofs 2 has a cruciate cross section. As observed in FIG. 11, each of the warps 1 and woofs 2 is twisted to constitute a wire-stranded structure. As seen in FIG. 12, each of the warps 1 and woofs 2 is spirally wound to constitute a helix structure.

Figure 13:
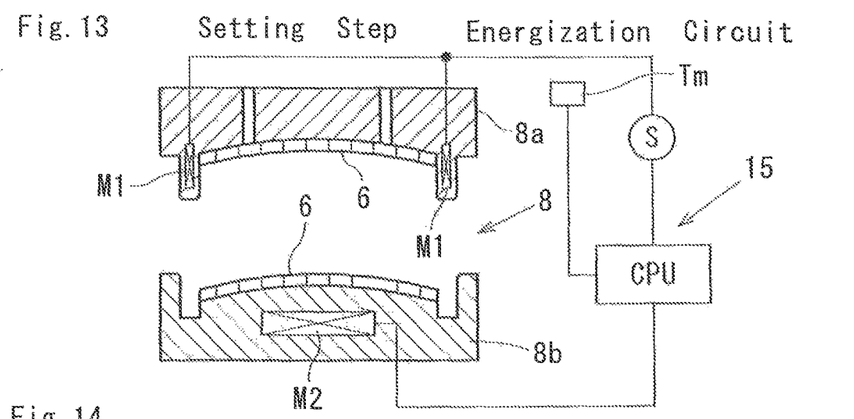
FIGS. 13 through 15 are longitudinal cross sectional views of a metallic mold die sequentially depicted to show processes how to form a synthetic resin body according to a second embodiment of the invention.
Figure 14:
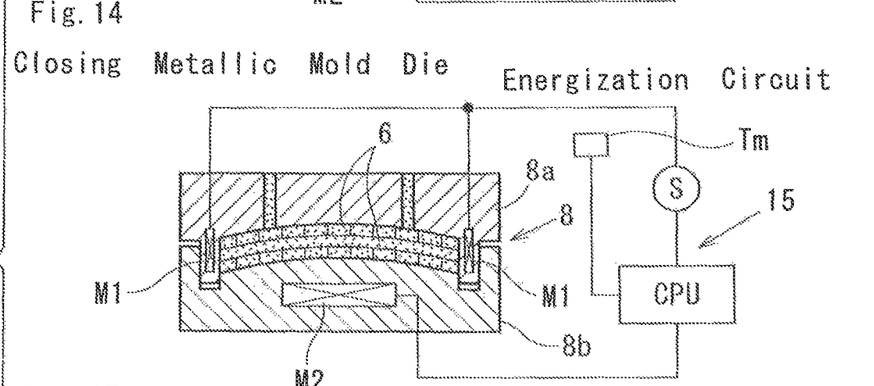
Figure 15:
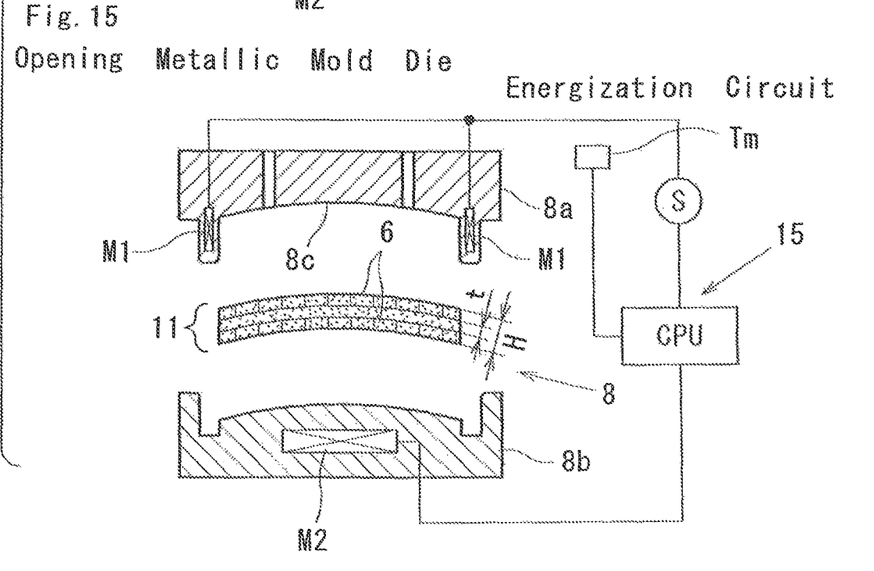

FIG. 13 through FIG. 15 show a second embodiment of the invention in which a first electrical magnet (M1) and a second electrical magnet (M2) are provided instead of the magnet pieces (9a, 9b, 10a, 10b) of the first embodiment of the invention. The first and second electrical magnets (M1, M2) are connected to a communication circuit 15 in which a central processing unit (CPU) is provided as shown in FIG. 13.

Upon implementing the setting step and resin-forming step, the first and second electrical magnets (M1, M2) serves as electromagnetic coils to place the flat structures 6 in position when energized via the central processing unit (CPU) at the time of placing the flat structures 6 within the metallic mold die 8. The first and second electrical magnets (M1, M2) are adapted to be deenergized when opening the metallic mold die 8.

Namely, upon implementing the setting step and the resin-forming step, the latter of which works as a positioning step as shown in FIGS. 13 and 14, one of the flat structures 6 is attached to the upper mold die 8a, and the other of the flat structures 6 is attached to the lower mold die 8b through electromagnetic attraction when placing the flat structures 6 within the metallic mold die 8.

Upon implementing the procedure to open the metallic mold die 8 as shown in FIG. 15, the first and second electrical magnets (M1, M2) are deenergized via the central processing unit (CPU), thereby setting the flat structures 6 free from the electromagnetic attraction. This makes it possible to readily take the flat structures 6 out from the mold cavity 8c of the metallic mold die 8.

Figure 16:
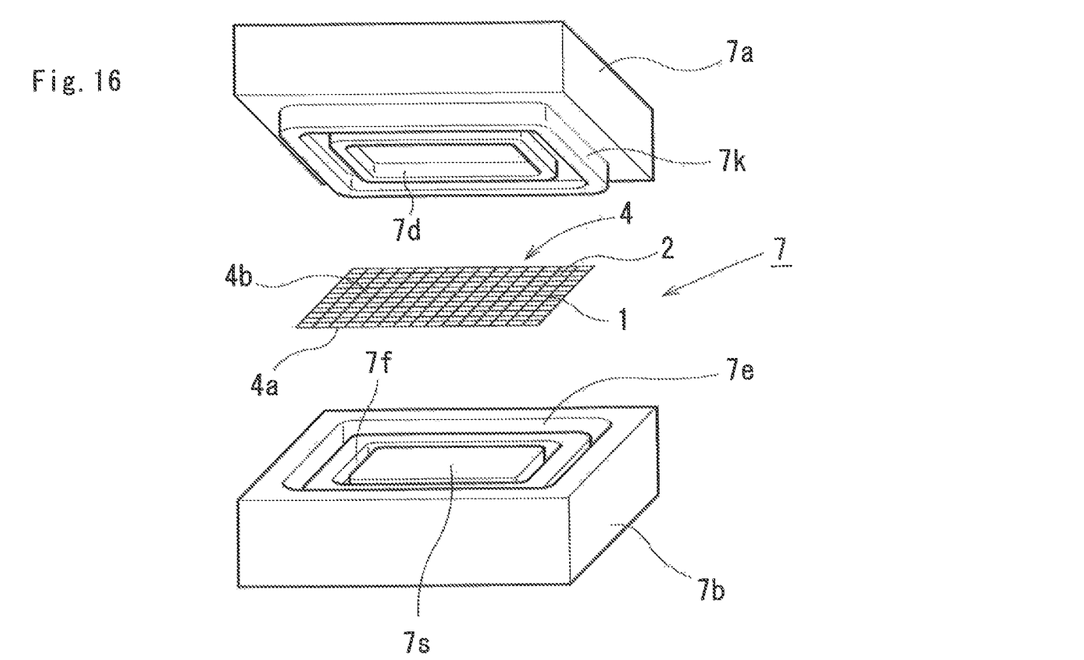
FIG. 16 is an exploded perspective view of the metallic press die according to a third embodiment of the invention.
Figure 17:
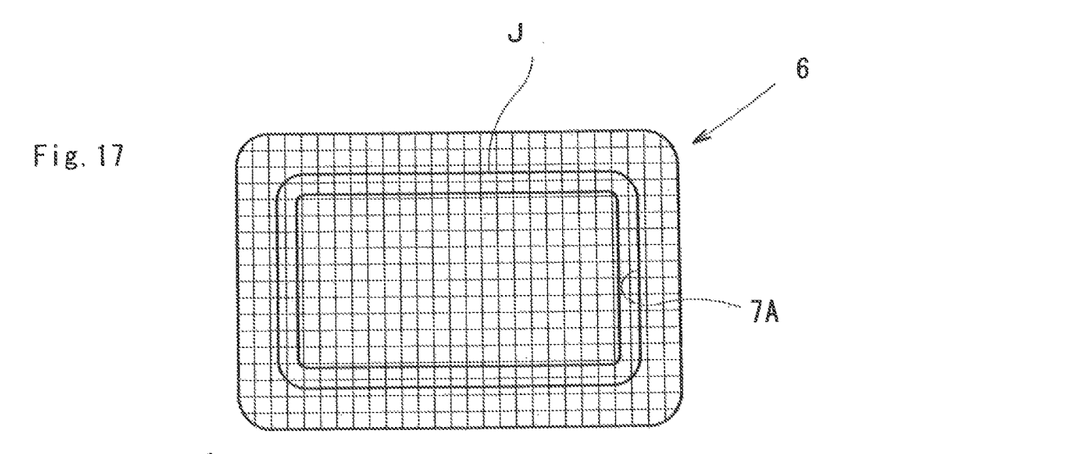
FIG. 17 is a plan view of the flat structure in which a strengthened jet is provided.
Figure 18:
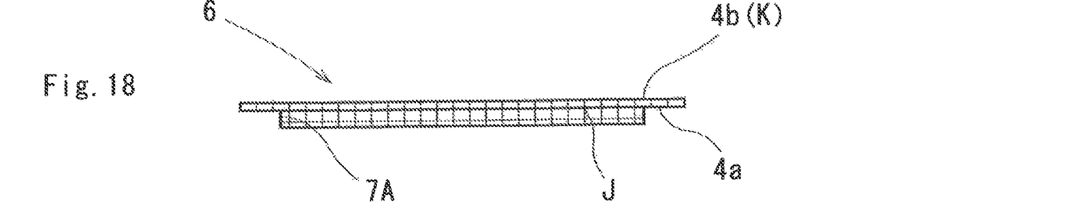
FIG. 18 is a side elevational view of the flat structure in which the strengthened jet is provided.

FIGS. 16 through 18 show a third embodiment of the invention in which the two-dimensional steel fabric 4 has an outer surface having an obverse surface side 4b and a reverse surface side 4a. The two-dimensional steel fabric 4 is partly depressed to shape a concave recess 7A from the obverse surface side 4b toward the reverse surface side 4a to let the concave recess 7A serve as a strengthened jut J at the time of forming the two-dimensional steel fabric 4 together with the warps 1 and woofs 2.

For the purpose of making the concave recess 7A, the metallic press die 7 is modified as represented by FIG. 16. The metallic press die 7 has an upper press die 7a and lower press die 7b. A lower surface of the upper press die 7a has a rectangular frame 7k and a pressure frame 7d each concentrically located to be substantially on the same level. An upper surface 7s of the lower press die 7b has a rectangular groove 7e corresponding to the rectangular frame 7k, and having a pressure groove 7f corresponding to the pressure frame 7d.

Upon implementing the pressing procedure, the flat structures 6 have the same dimension as an inner area surrounded by the rectangular frame 7k, and placed between the upper press die 7a and the lower press die 7b as implemented in the first embodiment of the invention as shown in FIG. 4. Then, during the procedure in which the upper press die 7a is moved toward the lower press die 7b, the rectangular frame 7k is forced to penetrate into the rectangular groove 7e, and while at the same time, depressing the pressure frame 7d against the flat structure 6 to penetrate the flat structure 6 into the pressure groove 7f.

After completing the pressing procedure, the upper press die 7a is lifted to withdraw the rectangular frame 7k from the rectangular groove 7e. This procedure imparts a cosmetic surface K with the upper surface side 7b of the flat structure 6, and while at the same time, adding an strengthened jut J with the lower surface side 7a of the flat structure 6 as shown in FIGS. 17 and 18.

Figures 19, 20:
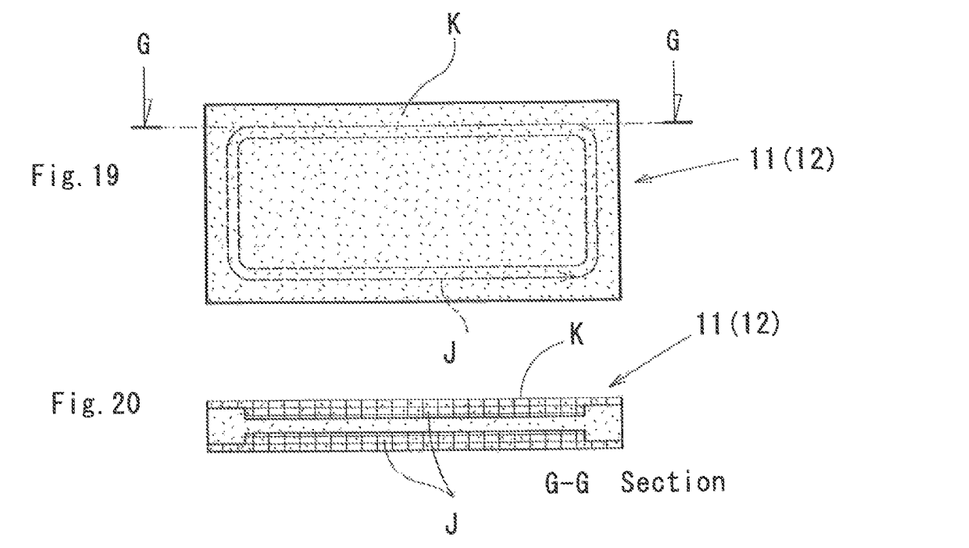
FIG. 19 is a plan view of the synthetic resin body in which the flat structure has the strengthened jet according to a fourth embodiment of the invention.
FIG. 20 is a longitudinal cross sectional view of the flat structure taken along lines G-G of FIG. 19.
Figures 21, 22:
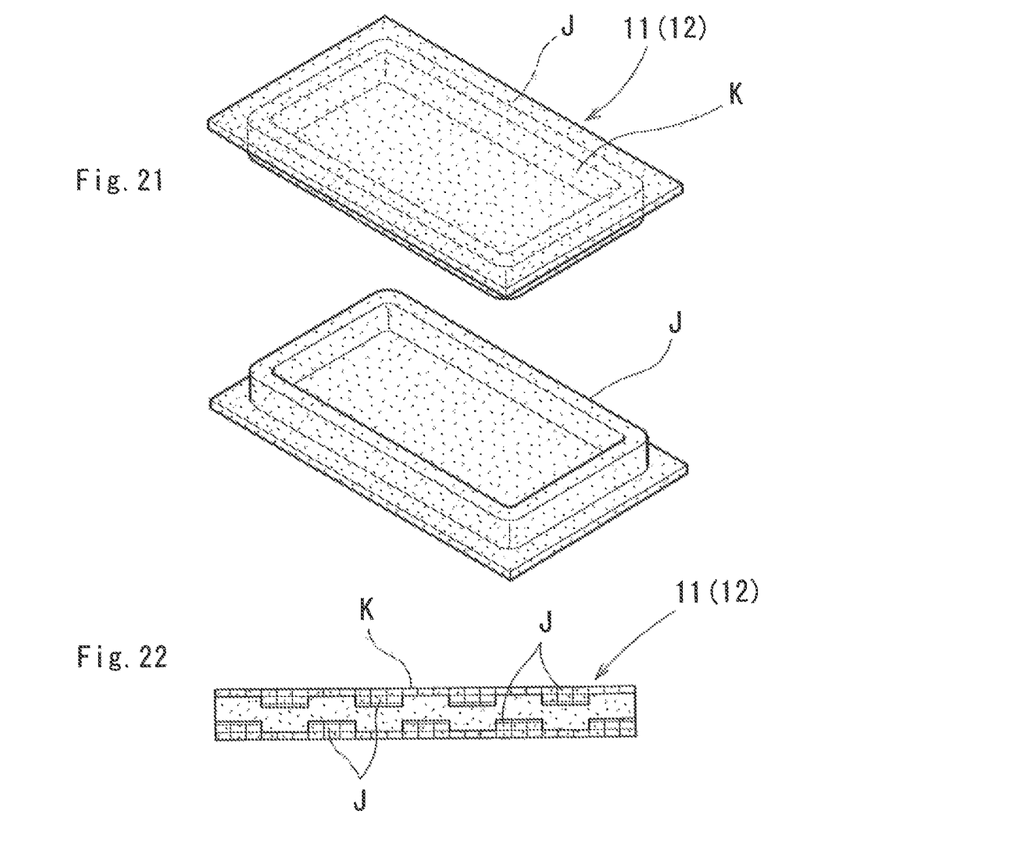
FIG. 21 is an exploded perspective view of the flat structure each arranged at an upper and lower position.
FIG. 22 is a longitudinal cross sectional view of the synthetic resin body in which the flat structure has the strengthened jet according to a fifth embodiment of the invention.

As a fourth embodiment of the invention, two flat structures 6 are prepared in order to undergo the injection to mold the synthetic resin body 11 as shown in FIG. 19 through 21.

With the concave recess provided on the flat structures 6 to serve as the strengthened jut J, it is possible to significantly reinforce the synthetic resin body 11 with the minimum cost.

As a fifth embodiment of the invention, a plurality of the strengthened juts J may be provided with the flat structures 6 in a staggering manner as shown in FIG. 22.

One of the flat structures 6 has the upper strengthened juts J, and the other of the flat structures 6 has the lower strengthened juts J which correspond to an inner space appeared between the neighboring juts J in the upper position.

Figures 23, 24, 25, 26, 27:
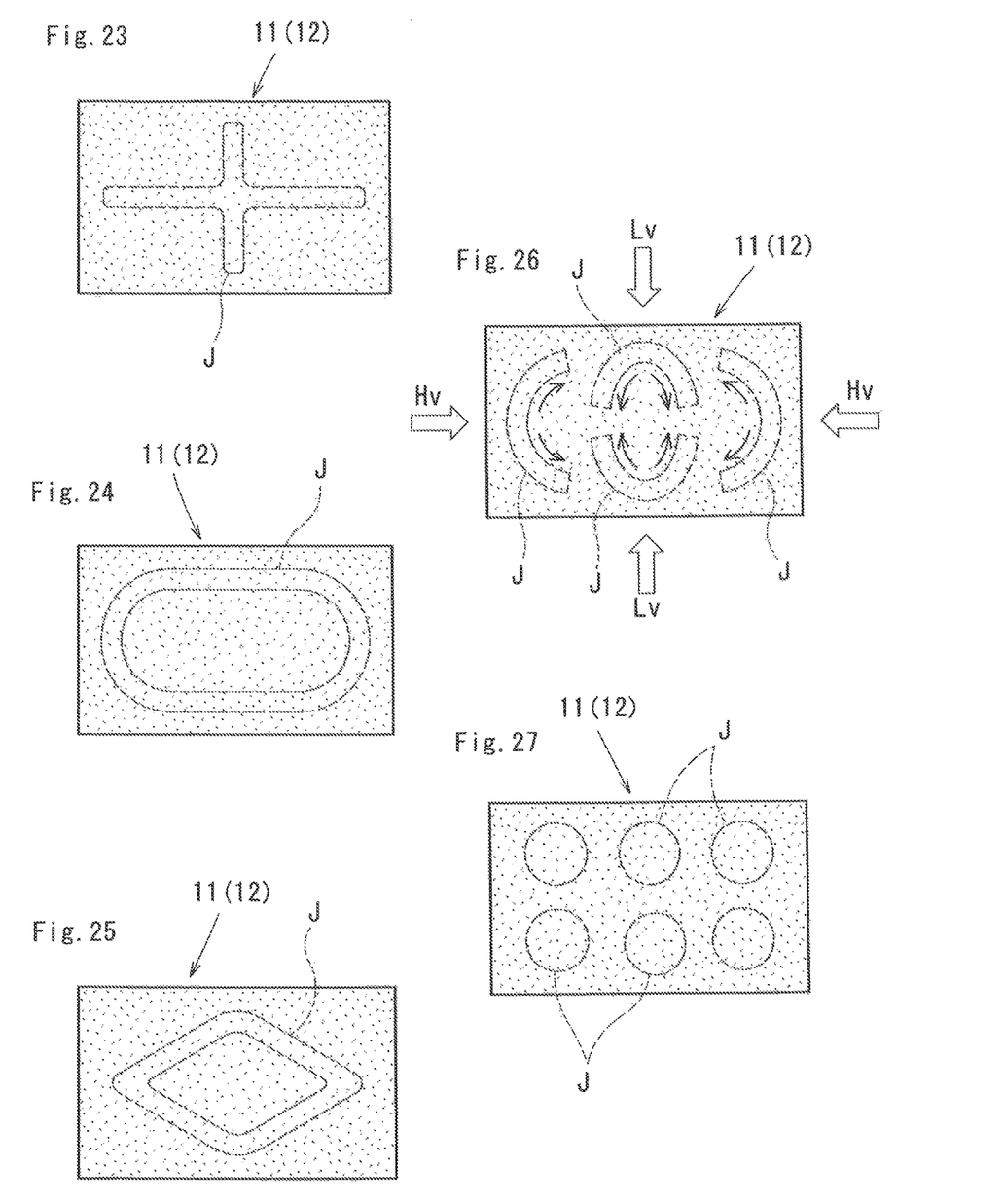
FIGS. 23 through 27 are plan views depicted to enumerate various modification forms of the strengthened jut.

FIGS. 23 through 27 enumerate various modification forms of the strengthened jut J. As shown in FIG. 23, the strengthened jut J has a cruciate configuration by depressing the flat structure 6. FIGS. 24 and 25 show the strengthened jut J each represented by an elliptic structure and a lozenge-shaped structure.

In FIG. 26, a pair of the strengthened juts J is contoured along a cubic parabola in symmetrical relationship in horizontal and vertical directions. FIG. 27 depicts a plurality of the strengthened juts J in column-shaped configuration.

Among the strengthened juts J enumerated as above (FIG. 26), the strengthened juts J contoured along the cubic parabola form arch-shaped constructions. This structure enables to convert both the horizontal force (Hv) and vertical force (Lv) into a compression force exerting in an axial direction of the strengthened juts J. This makes it possible to effectively disperse the exterior forces over an extensive area of the synthetic resin body 11.

Modification Forms

Figure 28:
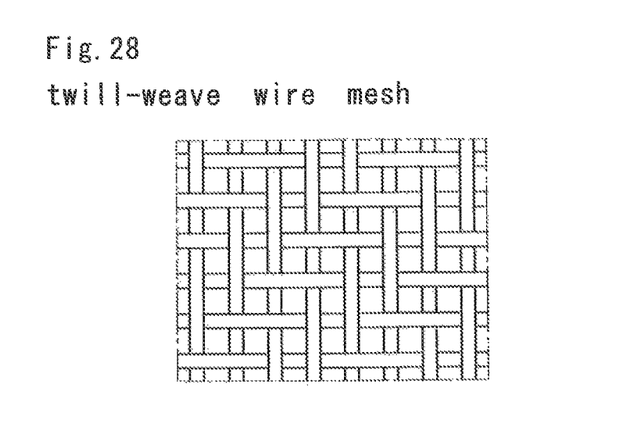
FIGS. 28 through 30 are plan views of modified two-dimensional steel fabrics each depicted to show other examples than the plain weave.
Figure 29:
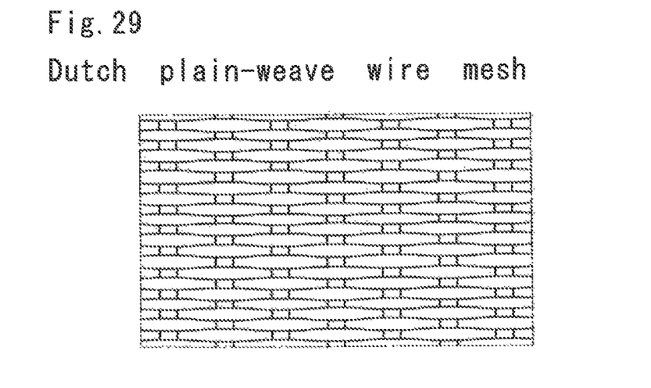
Figure 30:
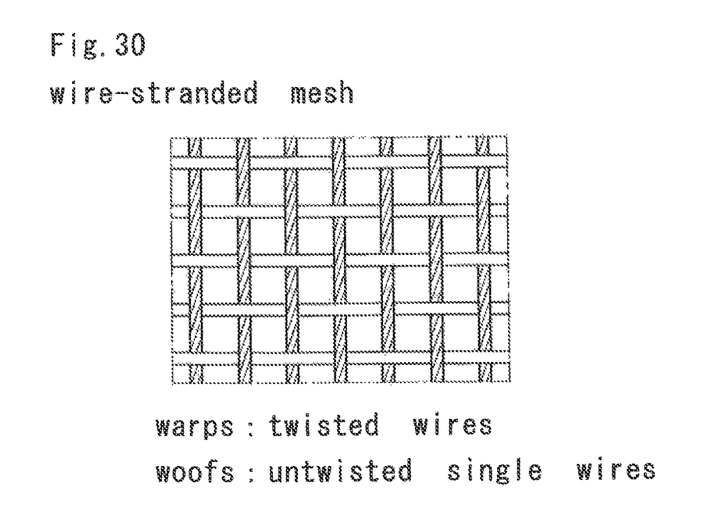

It is to be appreciated that the two-dimensional steel fabric 4 may be not only made of the plain-weave wire mesh but also the twill-weave wire mesh, Dutch plain-weave wire mesh or wire-stranded mesh as observed respectively in FIGS. 28 through 30.

Alternatively, the two-dimensional steel fabric 4 may be made from the Dutch-weave wire mesh. The warps 1 and woofs 2 may be circular, rectangular, elliptic, pentagonal or hexagonal in cross section, the configuration of which would be selected as desired under the given circumstances. In the two-dimensional steel fabric 4, the warps 1 and woofs 2 may have diameters from several micrometers to the same millimeters. By changing the warps 1 and woofs 2 in terms of the diameters, knitting manner, weaving manner and weaving density (coarseness or fineness), it is possible to appropriately adjust its weight and strength (bending strength and tensile strength) characteristic of the final product. When a high level of the reinforcement is needed for any part of the synthetic resin body 11, additional numbers of the flat structures 6 may be provided.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A method of forming a synthetic resin structure integral with two-dimensional steel fabric, comprising steps of:
    weaving warps and woofs each made from a steel metal including piano wires, so that said warps and said woofs together form a two-dimensional steel fabric in a planar configuration;
    severing said two-dimensional steel fabric by a predetermined quantity to make a fabric piece to shape said fabric piece into a flat structure by means of a shape-forming instrument including a pressing procedure;
    preparing a plurality of said flat structures and setting said flat structures at an upper die and lower die of a metallic mold die respectively, said flat structures being juxtaposed mutually in parallel relationship with a minimum distance apart between neighboring ones of said flat structures, and injecting a synthetic resin into said metallic mold die so as to form a synthetic resin body integral with said flat structures, so that said flat structures are embedded into said synthetic resin body as reinforcements.

2. The method of forming a synthetic resin structure integral with two-dimensional steel fabric according to claim 1, wherein each of said warps and woofs forms a plurality of wires twisted to serve as a stranded wire.

3. The method of forming a synthetic resin structure integral with two-dimensional steel fabric according to claim 1, wherein said synthetic resin includes both a thermoplastic material and thermosetting plastics and forms a moldable resin selected from a group consisting of ABS resin, (copolymer of acrylonitrile, butadiene and styrene) polypropylene, polystyrene and polyurethane.

4. The method of forming a synthetic resin structure integral with two-dimensional steel fabric according to claim 1, wherein said metallic mold die has a first magnet piece embedded in said upper mold die and having a second magnet embedded in said lower mold die, and upon setting said flat structures at said metallic mold die, one of said flat structures being attached to said upper mold die by a magnetic attraction of said first magnet piece, and other of said flat structures being attached to said lower mold die by a magnetic attraction of said second magnet piece.

5. The method of forming a synthetic resin structure integral with two-dimensional steel fabric according to claim 1, wherein said metallic mold die has a first electric magnet embedded in said upper mold die and having a second electric magnet embedded in said lower mold die, and said first and second electric magnet are energized when setting said flat structures at said metallic mold die, so that one of said flat structures is attached to said upper mold die by a magnetic attraction of said first electric magnet, and other of said flat structures is attached to said lower mold die by a magnetic attraction of said second electric magnet, and said first and second electric magnets are deenergized when opening said metallic mold die so as to release said flat structures from said metallic mold die.

6. The method of forming a synthetic resin structure integral with two-dimensional steel fabric according to claim 1, wherein said synthetic resin body is dimensionally 50 mm at maximum in thickness with said minimum distance measured as 0.5 mm-10 mm.

7. The method of forming a synthetic resin structure integral with two-dimensional steel fabric according to claim 1, wherein said two-dimensional steel fabric has an outer surface including an obverse surface side and a reverse surface side, and said two-dimensional steel fabric is partly depressed to shape a concave recess from said obverse surface side toward said reverse surface side to let said concave recess serve as a strengthened jut at the time of forming said two-dimensional steel fabric from said warps and said woofs.

\* \* \* \* \*